(12) United States Patent
Jo et al.

(10) Patent No.: US 11,221,953 B2
(45) Date of Patent: Jan. 11, 2022

(54) MEMORY DEVICE PERFORMING IN-MEMORY PREFETCHING AND SYSTEM INCLUDING THE SAME

(71) Applicant: SAMSUNG ELECTRONICS CO., LTD., Suwon-si (KR)

(72) Inventors: In-Soon Jo, Hwaseong-si (KR); Young-Geun Choi, Suwon-si (KR); Seung-Yeun Jeong, Anseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 16/406,304

(22) Filed: May 8, 2019

(65) Prior Publication Data
US 2020/0110705 A1      Apr. 9, 2020

(30) Foreign Application Priority Data

Oct. 8, 2018    (KR) .................. 10-2018-0119527

(51) Int. Cl.
  *G06F 12/0862*   (2016.01)
  *G06F 9/30*      (2018.01)
  *G06F 12/0877*   (2016.01)

(52) U.S. Cl.
  CPC ...... *G06F 12/0862* (2013.01); *G06F 9/30101* (2013.01); *G06F 12/0877* (2013.01); *G06F 2212/6022* (2013.01)

(58) Field of Classification Search
  CPC ......... G06F 12/0862; G06F 2212/6022; G06F 2212/6028; G06F 2212/6026; G06F 9/30101
  See application file for complete search history.

(56) References Cited

U.S. PATENT DOCUMENTS

| 5,768,559 A | 6/1998 | Iino et al. |
| 5,964,867 A | 10/1999 | Anderson et al. |
| 7,539,844 B1 | 5/2009 | Ekanadham et al. |
| 8,209,488 B2 | 6/2012 | Arimilli et al. |
| 9,582,422 B2 | 2/2017 | Yu et al. |
| 10,013,391 B1 | 7/2018 | Agarwal et al. |

(Continued)

OTHER PUBLICATIONS

D. Lukarski, Lecture Slides, Apr. 11, 2013, Uppsala (Year: 2013).*

(Continued)

*Primary Examiner* — Ramon A. Mercado
(74) *Attorney, Agent, or Firm* — F. Chau & Associates, LLC

(57) ABSTRACT

A memory device includes a memory cell array, an information register and a prefetch circuit. The memory cell array stores a valid data array, a base array and a target data array, where the valid data array includes valid elements among elements of first data, the base array includes position elements indicating position values corresponding to the valid elements and the target data array includes target elements of second data corresponding to the position values. The information register stores indirect memory access information including a start address of the target data array and a unit size of the target elements. The prefetch circuit prefetches, based on the indirect memory access information, the target elements corresponding to the position elements that are read from the memory cell array.

18 Claims, 17 Drawing Sheets

(56) References Cited

U.S. PATENT DOCUMENTS

| | | | |
|---|---|---|---|
| 2003/0018879 A1* | 1/2003 | Sahraoui | G06F 9/3555 |
| | | | 712/1 |
| 2007/0283105 A1* | 12/2007 | Kalogeropulos | G06F 12/0862 |
| | | | 711/154 |
| 2014/0032625 A1* | 1/2014 | McCarthy | G06F 17/16 |
| | | | 708/607 |
| 2014/0181415 A1 | 6/2014 | Loh et al. | |
| 2015/0067273 A1* | 3/2015 | Strauss | G06F 9/5066 |
| | | | 711/147 |
| 2016/0188476 A1* | 6/2016 | Yu | G06F 9/30047 |
| | | | 711/137 |
| 2016/0224465 A1* | 8/2016 | Morad | G06F 15/7825 |
| 2017/0083338 A1 | 3/2017 | Burger et al. | |
| 2017/0091103 A1* | 3/2017 | Smelyanskiy | G06F 12/0891 |

OTHER PUBLICATIONS

European Extended Search Report dated Mar. 5, 2020 in Corresponding European Patent Application No. EP191908151.

* cited by examiner

FIG. 3

$$\begin{bmatrix} 7 & 0 & 0 & 0 & 0 & 0 & 0 & -2.5 & 0 & 0 \\ 0 & 0 & 0 & -5 & 0 & 0 & 0 & 0 & 0 & 0 \\ 0 & 3 & 0 & 0 & 0 & 0 & 0 & 0 & 0 & 0 \\ -6 & 0 & 0 & 0 & 0 & 0 & 0 & 0 & 0 & 0 \\ 0 & 0 & 37 & 0 & 0 & 0 & 0 & 9 & 0 & 0 \end{bmatrix}_{SM} \times \begin{bmatrix} 1 \\ 32 \\ 4 \\ -5 \\ 8 \\ 7 \\ 13 \\ 5 \\ 43 \\ -7 \end{bmatrix}_{CV}$$

FIG. 4A

| A(1) | 7 |
|---|---|
| A(2) | -2.5 |
| A(3) | -5 |
| A(4) | 3 |
| A(5) | -6 |
| A(6) | 37 |
| A(7) | 9 |

AA

| | ROW | COLUMN |
|---|---|---|
| B(1) | 1 | 1 |
| B(2) | 1 | 8 |
| B(3) | 2 | 4 |
| B(4) | 3 | 2 |
| B(5) | 4 | 1 |
| B(6) | 5 | 3 |
| B(7) | 5 | 8 |

| T(1) | 1 |
|---|---|
| T(2) | 32 |
| T(3) | 4 |
| T(4) | -5 |
| T(5) | 8 |
| T(6) | 7 |
| T(7) | 13 |
| T(8) | 5 |
| T(9) | 43 |
| T(10) | -7 |

| IMAI1 | TSADD | TSZ |

FIG. 6B

| IMAI2 | TSADD | TSZ | BSADD | BSZ | NT | NR |

FIG. 6C

| IMA13 | TSADD | TSZ | ASADD | ASZ | BSADD | BSZ | NT | NR |

MEMORY DEVICE PERFORMING IN-MEMORY PREFETCHING AND SYSTEM INCLUDING THE SAME

CROSS-REFERENCE TO RELATED APPLICATION

This U.S. Non-provisional application claims priority under 35 USC § 119 to Korean Patent Application No. 10-2018-0119527, filed on Oct. 8, 2018, in the Korean Intellectual Property Office (KIPO), the disclosure of which is incorporated by reference in its entirety herein.

BACKGROUND

1. Technical Field

Exemplary embodiments relate generally to semiconductor integrated circuits, and more particularly to a memory device performing in-memory prefetching and a system including the memory device.

2. Discussion of Related Art

Prefetching is a technique used by computer processors to boost execution performance by fetching instructions or data from their original storage in slower memory to a faster local memory before it is actually needed. In case of irregular data accesses such as an indirect memory access, it is difficult to increase of an operation speed when prefetching based on locality of data. Even though software and hardware prefetching methods considering indirect memory access patterns have been proposed, an excessive bandwidth may be exhausted in detecting and predicting the indirect memory access or the bandwidth may be exhausted in reading unnecessary data due to incorrect detection and prediction.

SUMMARY

At least one exemplary embodiment of the inventive concept may provide a memory device and a system including a memory device capable of enhancing efficiency of indirect memory accesses.

At least one exemplary embodiment of the inventive concept may provide a memory device and a system including a memory device capable of enhancing efficiency of a processing-in-memory (PIM) architecture through indirect memory accesses.

According to an exemplary embodiment of the inventive concept, a memory device includes a memory cell array, an information register and a prefetch circuit. The memory cell array stores a valid data array, a base array and a target data array, where the valid data array sequentially includes valid elements among elements of first data, the base array sequentially includes position elements indicating position values corresponding to the valid elements, and the target data array sequentially includes target elements of second data corresponding to the position values. The information register stores indirect memory access information including a start address of the target data array and a unit size of the target elements. The prefetch circuit prefetches, based on the indirect memory access information, the target elements corresponding to the position elements that are read from the memory cell array.

According to an exemplary embodiment of the inventive concept, a memory device includes a plurality of memory semiconductor dies stacked in a vertical direction in which memory cell arrays are formed, a plurality of through-silicon vias electrically connecting the plurality of memory semiconductor dies, an information register, and a prefetch circuit. The memory cell arrays store a valid data array, a base array and a target data array. The valid data array sequentially includes valid elements among elements of first data. The base array sequentially includes position elements indicating position values corresponding to the valid elements. The target data array sequentially includes target elements of second data corresponding to the position values. The information register is configured to store indirect memory access information including a start address of the target data array and a unit size of the target elements. The prefetch circuit is configured to prefetch, based on the indirect memory access information, the target elements corresponding to the position elements that are read from the memory cell array.

According to an exemplary embodiment of the inventive concept, a system includes a memory device and a host device comprising a memory controller configured to control access to the memory device. The memory device includes a memory cell array configured to store a valid data array, a base array and a target data array, an information register, and a prefetch circuit. The valid data array sequentially includes valid elements among elements of first data. The base array sequentially includes position elements indicating position values corresponding to the valid elements. The target data array sequentially includes target elements of second data corresponding to the position values. The information register is configured to store indirect memory access information including a start address of the target data array and a unit size of the target elements. The prefetch circuit is configured to prefetch, based on the indirect memory access information, the target elements corresponding to the position elements that are read from the memory cell array.

According to an exemplary embodiment of the inventive concept, a memory device includes a memory cell array configured to store a valid data array, a RAM, and a controller. The valid data array sequentially includes valid elements among elements of first data. The base array sequentially includes position elements indicating position values corresponding to the valid elements. The target data array sequentially includes target elements of second data corresponding to the position values. The controller is configured to receive indirect memory access information including a start address of the target data array and a unit size of the target elements, from an external device. The controller performs a prefetching operation in response to receipt of the indirect memory access information, wherein the prefetching operation reads the target elements using the start address and the unit size and stores the read target elements into the RAM.

The memory device and the system according to at least one exemplary embodiment of the inventive concept may enhance accuracy and efficiency of in-memory prefetching by performing an indirect memory access based on the indirect memory access information provided from the memory controller.

In addition, the memory device and the system according to at least one exemplary embodiment of the inventive concept may reduce delay of the indirect memory access and increase a speed of the in-memory prefetching by parallelizing data disposition for the indirect memory access and utilizing the bandwidth inside the memory device.

Further, a memory device and a system according to at least one exemplary embodiment of the inventive concept may perform a sparse data operation efficiently by performing a processing-in-memory operation using the in-memory prefetching.

BRIEF DESCRIPTION OF THE DRAWINGS

Exemplary embodiments of the present disclosure will be more clearly understood from the following detailed description taken in conjunction with the accompanying drawings.

FIG. 3 is a diagram illustrating an example of a sparse matrix vector multiplication (SpMV).

FIGS. 4A and 4B are diagrams illustrating data arrays corresponding to the SpMV of FIG. 3.

FIGS. 6A, 6B and 6C are diagrams illustrating exemplary embodiments of indirect memory access information for an in-memory prefetching according to an exemplary embodiment of the inventive concept.

DETAILED DESCRIPTION OF THE EXEMPLARY EMBODIMENTS

Figure 1:
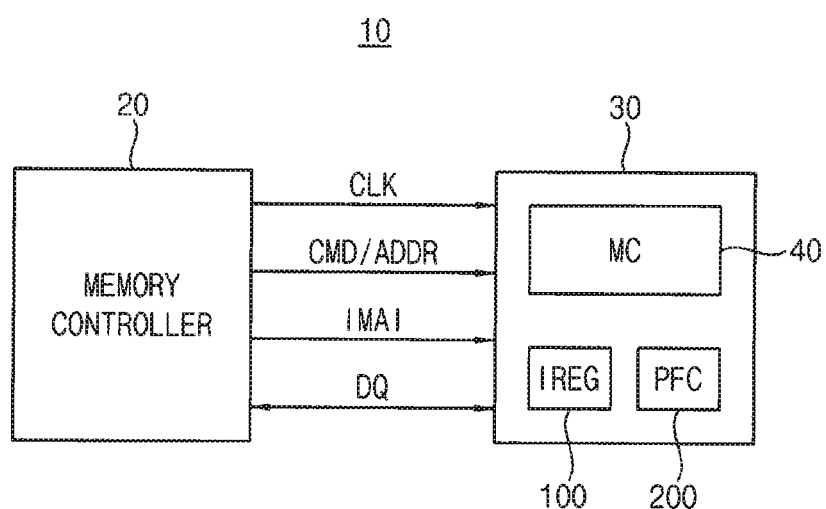
FIG. 1 is a block diagram illustrating a memory system including a memory device according to an exemplary embodiment of the inventive concept.

The inventive concept will be described more fully hereinafter with reference to the accompanying drawings, in which some exemplary embodiments are shown. In the drawings, like numerals refer to like elements throughout. The repeated descriptions may be omitted.

FIG. 1 is a block diagram illustrating a memory system including a memory device according to an exemplary embodiment of the inventive concept.

Referring to FIG. 1, a memory system 10 includes a memory controller 20 and a semiconductor memory device 30.

The memory controller 20 may control the overall operation of the memory system 10. The memory controller 20 may control the overall data exchange between an external host and the semiconductor memory device 30. For example, the memory controller 20 may write data to the semiconductor memory device 30 or read data from the semiconductor memory device 30 in response to a request from the host. In addition, the memory controller 20 may issue operation commands (e.g., a read command, a write command, etc.) to the semiconductor memory device 30 for controlling the semiconductor memory device 30. In an exemplary embodiment, the memory controller 20 is located within a host device.

In some exemplary embodiments, the semiconductor memory device 30 may be a memory device including dynamic memory cells such as a dynamic random access memory (DRAM), double data rate 4 (DDR4) synchronous DRAM (SDRAM), a low power DDR4 (LPDDR4) SDRAM or a LPDDR5 SDRAM.

The memory controller 20 may transmit a clock signal CLK, a command CMD and an address (signal) ADDR to the semiconductor memory device 30 and exchange data DQ with the semiconductor memory device 30. In addition, the memory controller 20 may provide indirect memory access information IMAI to the semiconductor memory device 30 according to a request of the host. The indirect memory access information IMAI may be provided to the semiconductor memory device 30 as additional control signals, or through a mode register write command for setting a mode register included in the semiconductor memory device 30.

The semiconductor memory device 30 may include a memory cell array MC 40, an information register IREG 100 and a prefetch circuit PFC 200. In an embodiment, a controller (e.g., a control circuit) includes the information register IREG 100 and the prefetch circuit PFC 200, and the controller performs a prefetching in response to receipt of the memory access information IMAI from a host device or a memory controller.

The memory cell array 40 may include a plurality of memory cells to store data. The memory cells may be grouped into a plurality of memory banks and each memory bank may include a plurality of data blocks.

According to control of the memory controller 20, a valid data array, a base array and a target data array may be stored in the memory cell array 40. The valid data array may sequentially include valid elements among elements of first data. The base array may sequentially include position elements indicating position values corresponding to the valid elements. The target data array may sequentially include target elements of second data corresponding to the position values. The valid data array, the base array and the target data array will be further described with reference to FIGS. 3, 4A and 4B.

The information register 100 may store the indirect memory access information IMAI provided from the memory controller 20. In an embodiment, the indirect memory access information IMAI includes at least a start address of the target data array and a unit size of the target elements. The indirect memory access information IMAI provided from the memory controller will be further described below with reference to FIGS. 6A, 6B, 6C and 7.

In an embodiment, the prefetch circuit 200 prefetches, based on the indirect memory access information IMAI, the target elements corresponding to the position elements that are read from the memory cell array 40.

A method for accelerating the memory access is prefetching, and conventional prefetching adopts a streaming or stride scheme that reads data in adjacent memory regions at the same time. The conventional prefetching assumes spatial locality of data to read the adjacent data at the same time. However, conventional prefetching may exhaust memory bandwidth unnecessarily.

A new prefetching technique according to an exemplary embodiment of the inventive concept includes detecting an indirect memory access, predicting addresses of the indirect memory access, and reading data from the predicted addresses.

The prefetching cost has to be minimized so as to prevent delay of other memory accesses due to prefetching. It is very important to detect and predict the indirect memory access precisely and optimize the prefetching operation. If the bandwidth is exhausted by the wrong detection and prediction or prefetching itself exhausts considerable bandwidth, performance of an entire system may be degraded by causing delay of other workloads.

In an embodiment, a prefetching technique for reducing delay of the indirect memory access is divided into software prefetching and hardware prefetching.

The software prefetching focuses on accuracy of detection and prediction of the indirect memory access based on the fact that software access has an advantage in accuracy compared with hardware access. In other words, in comparison with hardware that cannot grasp contents of application workload executed by a host device, software may predict when the indirect memory access occurs and what portion of the memory device has to be accessed, exactly with lower cost through source code inspection. For example, when the indirect memory access code is caught by a compiler while scanning the source code, the compiler may insert a prefetch command before the indirect memory access code. The delay of the indirect memory access may be prevented by prefetching data based on the inserted prefetch command and using the prefetched data in the afterward operations.

However, the software prefetching may not reduce the prefetching cost enough. Even though the software prefetching may be performed more easily than the hardware prefetching, it may not be possible to detect the indirect memory access perfectly through automatic code analysis and wrong detection or detection overlooking may occur. In addition, the command insertion per detected code may increase the number of the prefetch commands significantly.

The hardware prefetching may solve the problems of the software prefetching. For example, a future cache miss may be predicted by monitoring a cache miss occurring just after a prefetch table access so as to obtain information on the indirect memory access. The prefetching may be performed by calculating the addresses of the data to be prefetched through such monitoring and prediction.

However the hardware prefetching may not avoid the problems of accuracy and cost. The hardware cannot catch execution context of each workload and thus the cache miss just after the prefetch table access is considered as the indirect memory access in the hardware prefetching. The insufficient information may not sufficiently enhance accuracy of detection and prediction, and thus unnecessary prefetching may be caused due to detection errors of the indirect memory access.

In contrast, the memory device and the system according to an exemplary embodiment of the inventive concept may enhance accuracy and efficiency of the in-memory prefetching by performing the indirect memory access based on the indirect memory access information provided from the memory controller.

Figure 2:
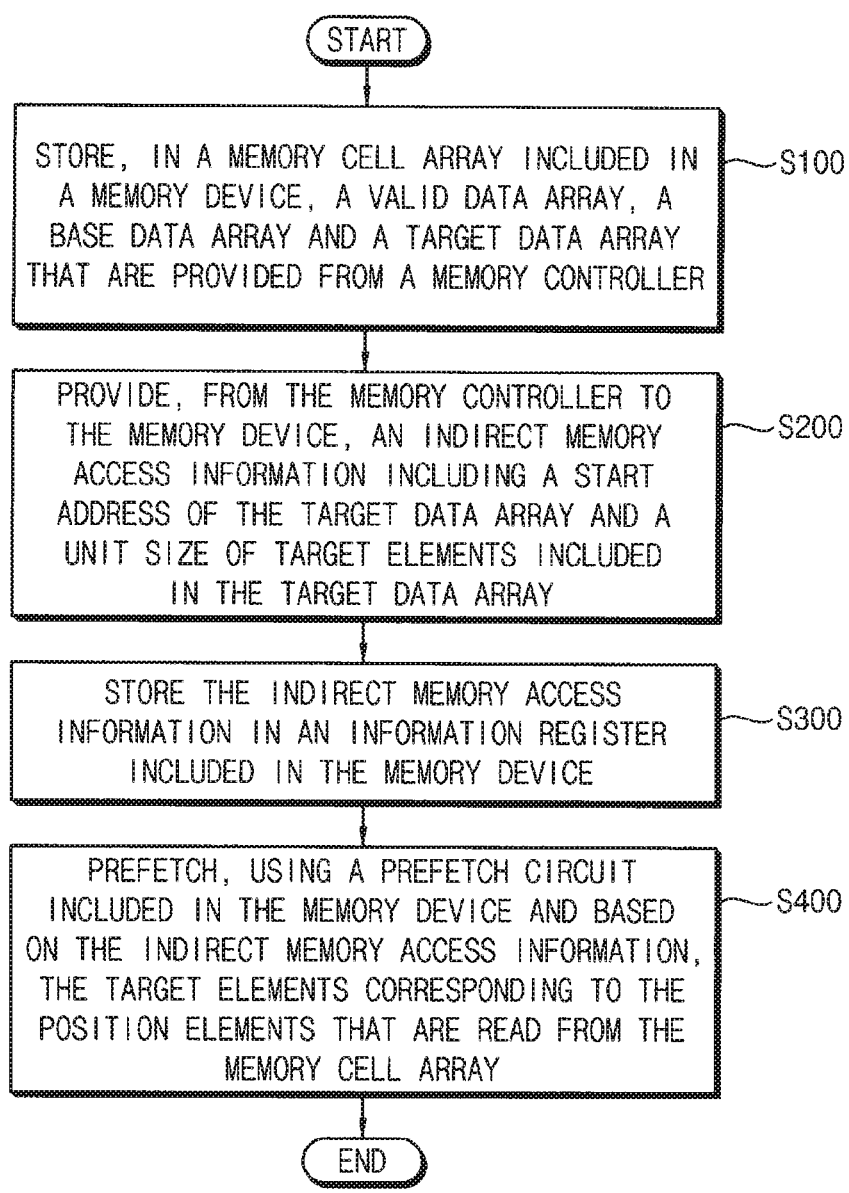
FIG. 2 is a flow chart illustrating a method of controlling a memory device according to an exemplary embodiment of the inventive concept.

FIG. 2 is a flow chart illustrating a method of controlling a memory device according to an exemplary embodiment of the inventive concept.

Referring to FIGS. 1 and 2, a valid data array, a base array and a target data array that are provided from the memory controller 20 are stored in the memory cell array 40 included in the memory device 30 (S100). In an embodiment, the valid data array sequentially includes valid elements among elements of first data. In an embodiment, the base array sequentially includes position elements indicating position values corresponding to the valid elements. In an embodiment, the target data array sequentially includes target elements of second data corresponding to the position values.

The indirect memory access information IMAI is provided from the memory controller 20 to the memory device 30 (S200), and the memory device 30 stores the indirect memory access information IMAI in the information register 100 included in the memory device 30 (S300). The indirect memory access information IMAI includes at least a start address of the target data array and a unit size of the target elements.

Using the prefetch circuit 200 included in the memory device 30 and based on the indirect memory access information IMAI, the target elements corresponding to the position elements that are read from the memory cell array 40 are prefetched (S400). The in-memory prefetching may be performed efficiently using the prefetch circuit 200 and based on the indirect memory access information IMAI. In an embodiment, the read target elements are temporarily stored in a fast memory (e.g., a DRAM, an SRAM, a register, etc.) of the memory 30 as part of the prefetching before an operation is executed that needs to use the read target elements or data derived from the read target elements.

Hereinafter, an example sparse matrix vector multiplication (SpMV) is described with reference to FIGS. 3, 4A and 4B as an example to which the prefetching for the indirect memory access according to exemplary embodiments may be applied. For example, if a process of a host device predicts that the host device will soon need data results of the SpMV, the process host device could output the indirect memory access information IMAI to trigger the prefetching and the performance of the SpMV. For example, the process could predict that the host device will soon need the data results by parsing source code of an executable being executed by the host device for an instruction corresponding to the SpMV.

FIG. 3 is a diagram illustrating an example of SpMV, and FIGS. 4A and 4B are diagrams illustrating data arrays corresponding to the SpMV of FIG. 3.

FIG. 3 illustrates one sparse matrix SM and one column vector CV. FIG. 4A illustrates a valid data array AA and a base array BA corresponding to the sparse matrix SM of FIG. 3 and FIG. 4B illustrates a target data array corresponding to the column vector CV of FIG. 3. An example multiplication of the sparse matrix SM and the column vector CV will be described with reference to FIGS. 3, 4A and 4B, and it will be understood that the same description may be applied to various multiplications such as a multiplication of a row vector and a sparse matrix, a multiplication of a sparse matrix and another matrix, and so on.

One of the workloads common to high-performance computing, machine learning, deep learning, graph analytics, etc. is a sparse data operation. For example, the sparse data operation is a fundamental operation in a finite element simulation that is widely used in analysis of engineering such as mechanics, thermodynamics, hydrodynamics, etc., the recurrent neural network (RNN) for processing data of voice that varies over time, the page rank algorithm that assigns a weight value on a web document depending on its relative importance, and the like. Here, the sparse data indicates that a small portion of entire elements of data are valid elements having valid values, e.g., values other than zero as the sparse matrix SM of FIG. 3.

With respect to the sparse data, only the valid elements (e.g., non-zero) are stored for storage space efficiency. In case of the sparse matrix SM of FIG. 3, seven elements among fifty entire elements are valid elements. Only the seven valid elements among the entire elements and the corresponding information are stored to save the storage space of the memory device. As illustrated in FIG. 4A, only the valid data array AA sequentially including valid elements A(1)~A(7) among elements of fifty elements and the base array BA sequentially including position elements B(1)~B(7) indicating position values corresponding to the valid elements A(1)~A(7) are stored.

The main operation for a sparse matrix is a multiplication with a vector, that is, the SpMV as illustrated in FIG. 3. The positions of the vector elements (that is, the target elements) to be multiplied with the matrix elements (that is, the valid elements) are determined by the column positions of the matrix elements, which may be referred as the indirect memory access.

Considering the accessed vector elements of the column vector CV in the SpMV of FIG. 2, the calculation 7*1+(−2.5)*5 is performed with respect to the first row of the sparse matrix SM and thus the first and eighth elements of the column vector CV have to be read. The calculation (−5)*(−5) is performed with respect to the second row of the sparse matrix SM and thus the fourth element of the column vector CV has to be read.

In summary, only the valid elements of the sparse matrix SM are stored and the column positions of the stored valid elements are irregular such as 1, 8, 4, 2, 1, 3 and 8. The positions of the vector elements or the target elements are determined by the irregular column positions of the valid elements and thus the vector elements are accessed irregularly.

To generalize the above case, an array including the valid elements of the sparse matrix may be referred to as the valid data array AA, an array including the position or column information corresponding to the valid elements may be referred to as the base array BA and an array including the vector elements may be referred to as the target data array TA. With respect to the case of FIGS. 3, 4A and 4B, AA={A(1), A(2), A(3), A(4), A(5), A(6), A(7)}={7, −2.5, −5, 3, −6, 37, 9}, BA={B(1), B(2), B(3), B(4), B(5), B(6), B(7)}={1, 8, 4, 2, 1, 3, 8}, TA={T(1), T(2), T(3), T(4), T(5), T(6), T(7), T(8), T(9), T(10)}={1, 32, 4, −5, 8, 7, 13, 5, 43, −7}. The SpMV may be represented by A(i)*T[B(i)] where i=1-7 and T[B(i)] is the operation causing the indirect memory access.

The representative method for accelerating the memory access is prefetching, and the conventional prefetching adopts a streaming or stride scheme that reads data in adjacent memory regions at the same time to prevent repeated reading. In performing the operations A(i)*T[B(i)] of the SpMV, A(i) corresponds to the sequential access and the conventional prefetching may be effective. However, T[B(i)] becomes irregular while only the valid elements of the sparse matrix are stored, and thus the addresses of T[B(i)] become irregular.

In the examples of FIGS. 3, 4A and 4B, BA={1, 8, 4, 2, 1, 3, 8} and thus the necessary vector elements, that is, the target elements are T[1], T[8], T[4], T[2], T[1], T[3] and T[8], which cause the irregular accesses. The conventional prefetching has little effect on such irregular accesses because the target elements are read respectively when they are required. Thus significant delay of access to the memory device may be caused and performance of the SpMV may be degraded.

According to an exemplary embodiment, the performance of the SpMV may be enhanced by efficiently prefetching the target elements within the memory device in the indirect memory access.

Figure 5:
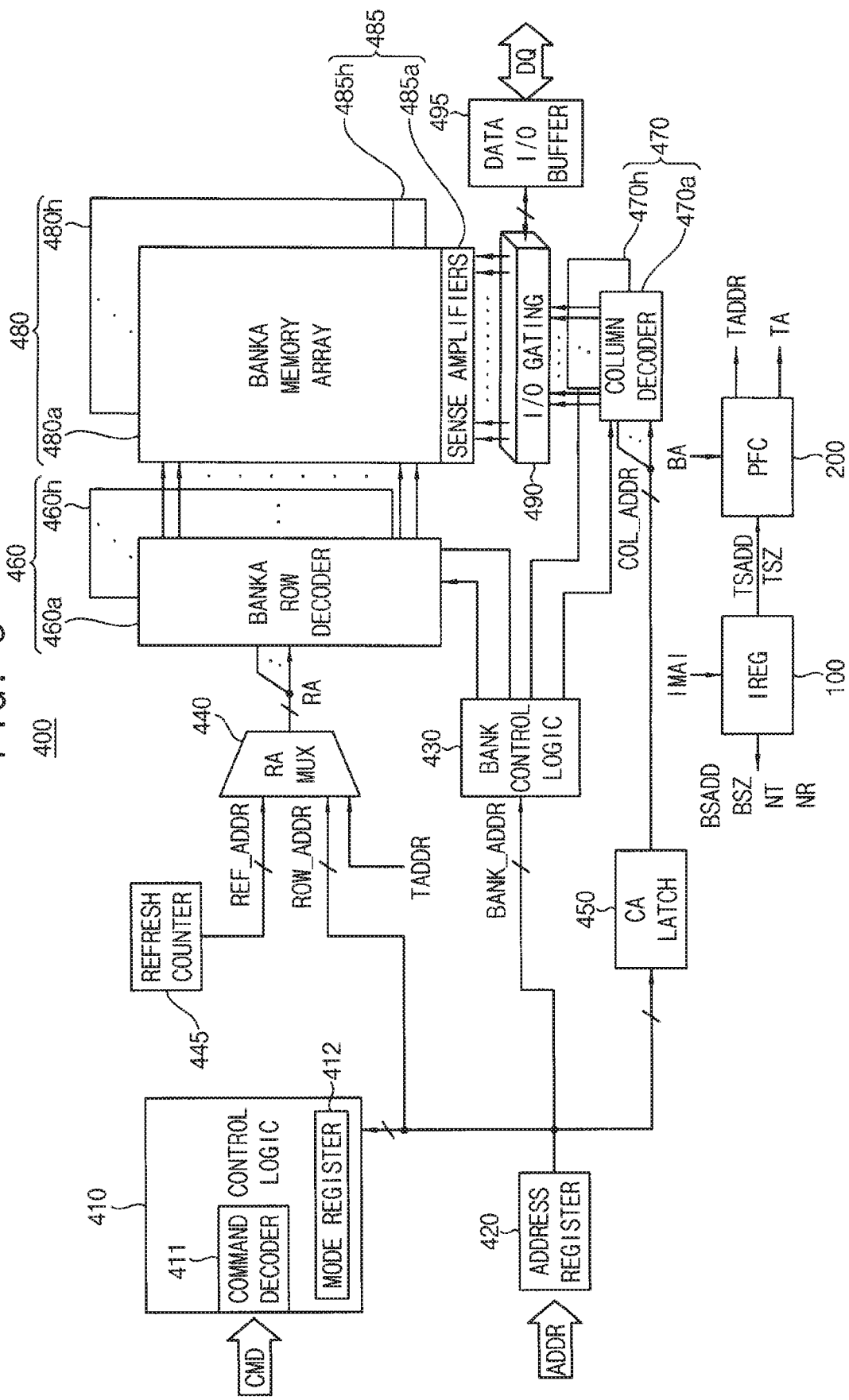
FIG. 5 is a block diagram illustrating a memory device according to an exemplary embodiment of the inventive concept.

FIG. 5 is a block diagram illustrating a memory device according to an exemplary embodiment of the inventive concept.

While a DRAM is described as an example of a memory device with reference to FIG. 5, a memory device according to exemplary embodiments may be any of a variety of memory cell architectures, including, but not limited to, volatile memory architectures such as DRAM, (Thyristor RAM) TRAM and SRAM, or non-volatile memory architectures, such as read-only-memory (ROM), flash memory, ferroelectric RAM (FRAM), magnetic RAM (MRAM), and the like.

Referring to FIG. 5, a memory device 400 includes a control logic 410 (e.g., a logic circuit), an address register 420, a bank control logic 430 (e.g., a logic circuit), a row address multiplexer 440, a column address latch 450, a row decoder 460 (e.g., a decoding circuit), a column decoder 470 (e.g., a decoding circuit), a memory cell array 480, a sense amplifier unit 485, an input/output (I/O) gating circuit 490, a data input/output (I/O) buffer 495, a refresh counter 445 (e.g., a counting circuit), an information register IREG 100 and a prefetch circuit PFC 200.

The memory cell array 480 may include a plurality of bank arrays 480*a*~480*h*. The row decoder 460 may include a plurality of bank row decoders 460*a*~460*h* respectively coupled to the bank arrays 480*a*~480*h*, the column decoder 470 may include a plurality of bank column decoders 470*a*~470*h* respectively coupled to the bank arrays 480*a*~480*h*, and the sense amplifier unit 485 may include a plurality of bank sense amplifiers 485*a*~485*h* respectively coupled to the bank arrays 480*a*~480*h*.

The address register 420 may receive an address ADDR including a bank address BANK_ADDR, a row address ROW_ADDR and a column address COL_ADDR from the memory controller. The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals in response to the bank address BANK_ADDR. One of the bank row decoders 460*a*~460*h* corresponding to the bank address BANK_ADDR may be activated in response to the bank control signals, and one of the bank column decoders 470*a*~470*h* corresponding to the bank address BANK_ADDR may be activated in response to the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 may be applied to the bank row decoders 460a~460h.

The activated one of the bank row decoders 460a~460h may decode the row address RA that is output from the row address multiplexer 440, and may activate a word-line corresponding to the row address RA. For example, the activated bank row decoder may apply a word-line driving voltage to the word-line corresponding to the row address RA.

The column address latch 450 may receive the column address COL_ADDR from the address register 420, and may temporarily store the received column address COL_ADDR. In some embodiments, in a burst mode, the column address latch 450 generates column addresses that increment from the received column address COL_ADDR. The column address latch 450 may apply the temporarily stored or generated column address to the bank column decoders 470a~470h.

The activated one of the bank column decoders 470a~470h may decode the column address COL_ADDR that is output from the column address latch 450, and may control the input/output gating circuit 490 to output data corresponding to the column address COL_ADDR.

The I/O gating circuit 490 may include circuitry for gating input/output data. The I/O gating circuit 490 may further include read data latches for storing data that is output from the bank arrays 480a~480h, and write drivers for writing data to the bank arrays 480a~480h.

Data to be read from one bank array of the bank arrays 480a~480h may be sensed by one of the bank sense amplifiers 485a~485h coupled to the one bank array from which the data is to be read, and may be stored in the read data latches. The data stored in the read data latches may be provided to the memory controller via the data I/O buffer 495. Data DQ to be written in one bank array of the bank arrays 480a~480h may be provided to the data I/O buffer 495 from the memory controller. The write driver may write the data DQ in one bank array of the bank arrays 480a~480h.

The control logic 410 may control operations of the memory device 400. For example, the control logic 410 may generate control signals for the memory device 400 to perform a write operation or a read operation. The control logic 410 may include a command decoder 411 that decodes a command CMD received from the memory controller and a mode register set 412 that sets an operation mode of the memory device 400. For example, the command decoder 411 may generate the control signals corresponding to the command CMD by decoding a write enable signal, a row address strobe signal, a column address strobe signal, a chip selection signal, etc.

In an exemplary embodiment, the information register 100 stores the indirect memory access information IMAI provided from an external memory controller. In an exemplary embodiment, the indirect memory access information IMAI includes at least a start address TSADD of the target data array TA and a unit size TSZ of the target elements included in the target data array TA. According to an exemplary embodiment, the indirect memory access information IMAI furthers include a start address BSADD of the base array BA, a unit size BSZ of the position elements included in the base array BA, a total number NT of the position elements and a read number NR of the position elements that are read simultaneously from the memory cell array 480. A method for using the indirect memory access information IMAI according to an exemplary embodiment will be described below.

In an exemplary embodiment, the prefetch circuit 200 prefetches, based on the indirect memory access information IMAI, the target elements corresponding to the position elements that are read from the memory cell array 480. In an exemplary embodiment, the start address TSZ of the target data array TA and the unit size TSZ of the target elements among the indirect memory access information IMAI are provided to the prefetch circuit 200 for calculation of the target addresses TADDR, and other information BSADD, BSZ, NT and NR may be provided to the control logic 410 for the overall control of the memory device 400. In an exemplary embodiment, the other information BSADD, BSZ, NT and NR may be stored in the mode register set 412.

Figure 6C:
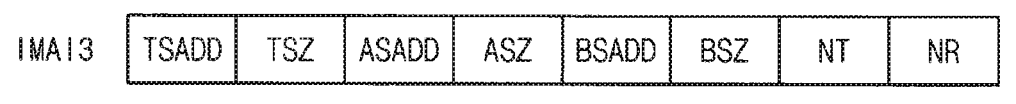

FIGS. 6A, 6B and 6C are diagrams illustrating exemplary embodiments of indirect memory access information for in-memory prefetching according to exemplary embodiments of the inventive concept.

Referring to FIG. 6A, an indirect memory access information IMAI1 includes a start address TSADD of a target data array TA and a unit size TSZ of target elements included in the target data array TA. In an exemplary embodiment, the indirect memory access information IMAI1 is provided to the memory device from the memory controller just after the write operations of the valid data array AA, the base array BA and the target data array TA have completed. In an exemplary embodiment, the indirect memory access information IMAI1 is provided to the memory device from the memory controller with a command or a mode signal indicating the indirect memory access. As will be described below with reference to FIG. 8, the prefetch circuit 200 may calculate the target address TADDR using the start address TSADD of the target data array TA and the unit size TSZ of the target elements.

Referring to FIG. 6B, an indirect memory access information IMAI2 includes a start address TSADD of a target data array TA and a unit size TSZ of target elements included in the target data array TA, a start address BSADD of a base array BA, a unit size BSZ of position elements included in the base array BA, a total number NT of the position elements and a read number NR of the position elements that are read simultaneously from the memory cell array.

Referring to FIG. 6C, an indirect memory access information IMAI3 includes a start address TSADD of a target data array TA and a unit size TSZ of target elements included in the target data array TA, a start address ASADD of a valid data array AA, a unit size ASZ of valid elements included in the valid data array AA, a start address BSADD of a base array BA, a unit size BSZ of position elements included in the base array BA, a total number NT of the position elements and a read number NR of the position elements that are read simultaneously from the memory cell array.

As will be described below, the information TSADD, TSZ, ASADD, ASZ, BSADD, BSZ, NT and NR may be used in calculation of addresses and control of repeated prefetching operations.

Figure 7:
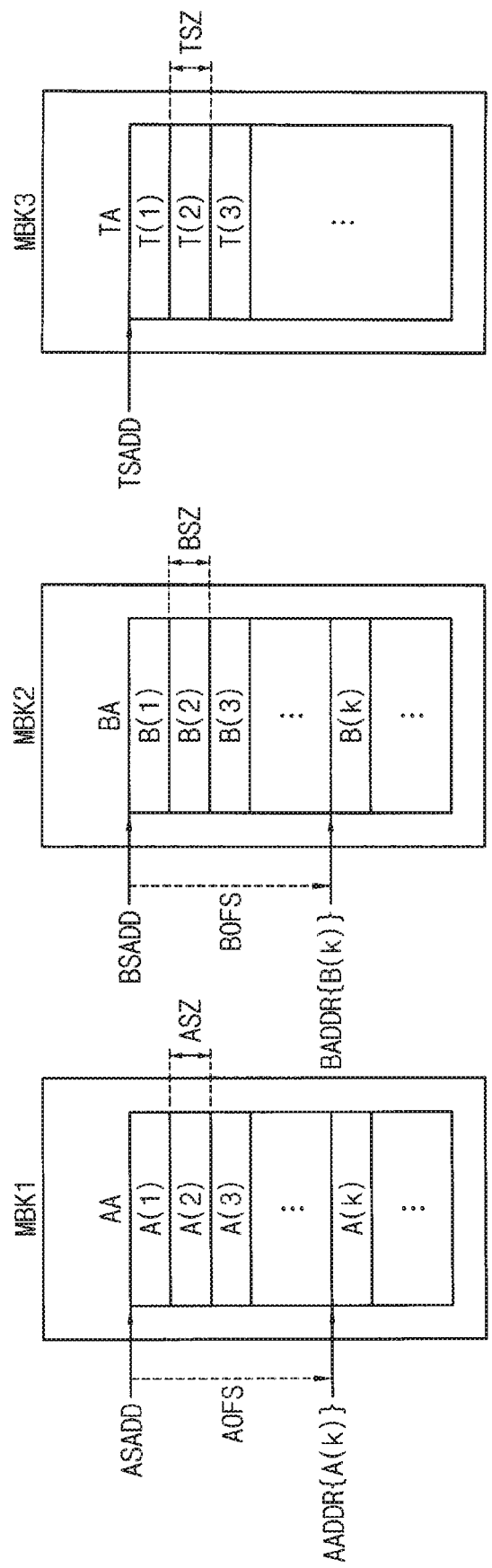
FIG. 7 is a diagram illustrating an example of data parallel disposition for an indirect memory access according to an exemplary embodiment of the inventive concept.

FIG. 7 is a diagram illustrating an example of data parallel disposition for indirect memory access according to an exemplary embodiment of the inventive concept.

In general, a memory device may include a plurality of memory banks, and FIG. 7 illustrates, as a non-limiting example, first, second and third memory banks MBK1, MBK2 and MBK3.

Referring to FIG. 7, the valid data array AA, the base array BA and the target data array TA are stored in different memory banks. For example, the valid data array AA is stored in the first memory bank MBK1, the base array BA is stored in the second memory bank MBK2 and the target data array TA is stored in the third memory bank MBK3.

The valid data array AA sequentially includes valid elements A(i) (where i is an index of an element) among elements of first data. The base array BA sequentially includes position elements B(i) indicating position values corresponding to the valid elements A(i). The target data array TA sequentially includes target elements T(i) of second data corresponding to the position values of the position elements B(i). As described with reference to FIGS. 3, 4A and 4B, the first data may be a sparse matrix and the second data may be a vector. In this case, the position values of the position elements B(i) may be the column positions of the valid elements A(i).

In general, a delay of accesses to the different memory banks is smaller than a delay of accesses to the same memory bank. The data may be read out substantially at the same time from the different memory banks or the different bank groups. As such, speed of memory access and prefetching may be increased by storing the valid data array AA, the base array BA and the target data array TA in the different memory banks.

The indirect memory access information IMAI may be used in calculation of addresses of data to be read out. For example, when an address of the k-th valid element A(k) in the valid data array AA is AADDR{A(k)}, the k-th position element B(k) in the base array BA corresponding to the k-th valid element A(k) may be calculated as Expression 1 and Expression 2.

$$AADDR\{A(k)\} = \qquad\qquad\qquad\qquad \text{Expression 1}$$
$$ASADD + AOFS = ASADD + (k-1)*ASZ,$$
$$(k-1) = (AADDR\{A(k)\} - ASADD)/ASZ$$

$$BADDR\{B(k)\} = \qquad\qquad\qquad\qquad \text{Expression 2}$$
$$BSADD + BOFS = BSADD + (k-1)*BSZ =$$
$$BSADD + (AADDR\{A(k)\} - ASADD)*BSZ/ASZ$$

As such, when the address AADDR{A(k)} of the k-th valid element A(k) is provided from the memory controller to the memory device, the address BADDR{B(k)} of the corresponding k-th position element B(k) may be calculated within the memory device using the stored indirect memory access information IMAI, and the k-th position element B(k) may be read out. Accordingly the delay for transferring the address may be reduced or elimination and the speed of prefetching and processing-in-memory may be further increased. The calculation of the target addresses using the start address TSADD of the target data array TA and the unit size TSZ of the target elements will be described below with reference to FIG. 8.

Figure 8:
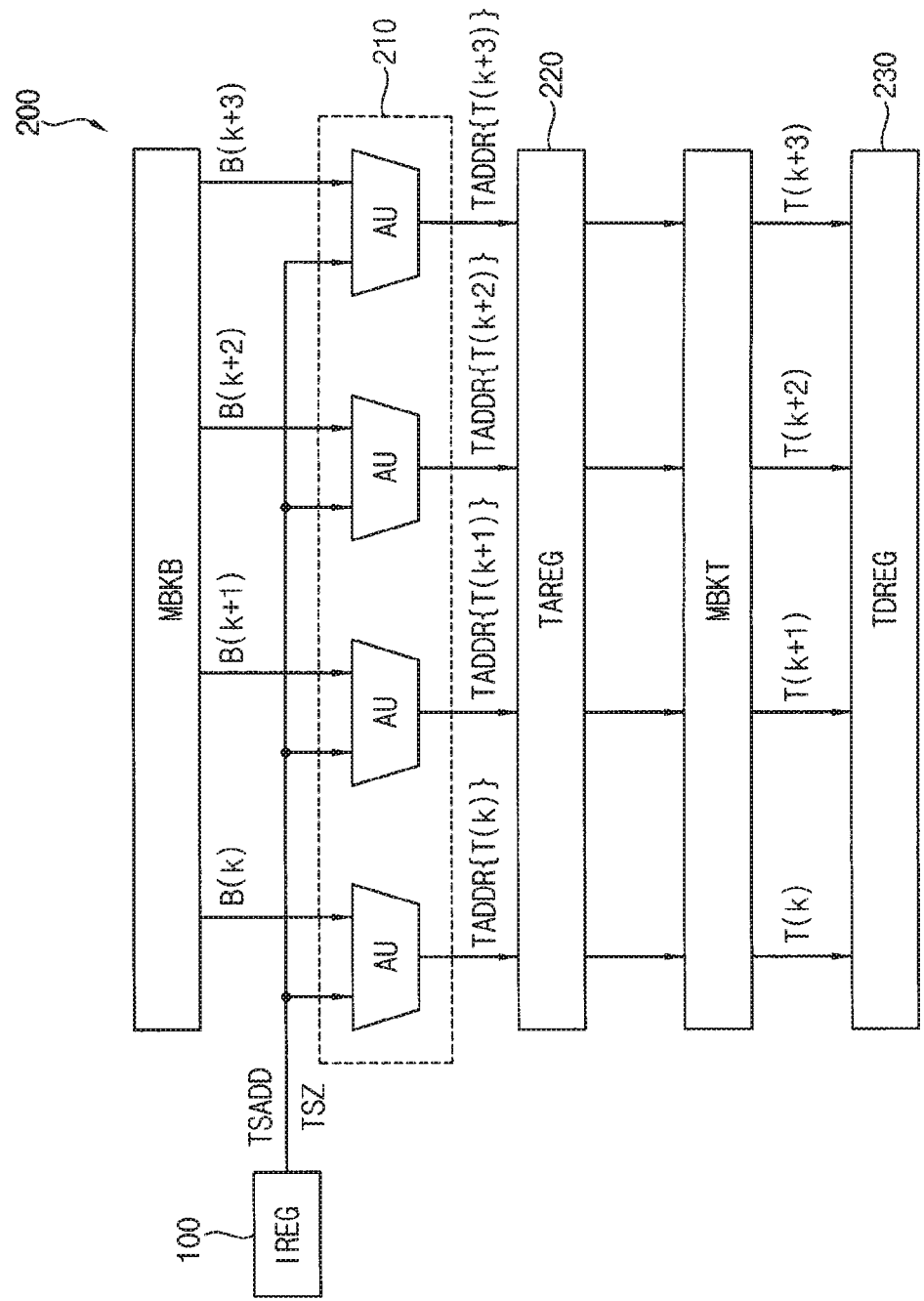
FIG. 8 is a diagram illustrating an exemplary embodiment of a prefetch circuit included in a memory device according to an exemplary embodiment of the inventive concept.

FIG. 8 is a diagram illustrating an exemplary embodiment of a prefetch circuit included in a memory device according to an exemplary embodiment of the inventive concept.

Referring to FIG. 8, a prefetch circuit 200 includes an arithmetic circuit 210 (e.g., one or more arithmetic logic units), a target address register TAREG 220 and a target data register TDREG 230. For representing data flow, FIG. 8 also illustrates an information register IREG 100, a memory bank MBKB storing the base array BA and a memory bank MBKT storing the target data array TA.

The arithmetic circuit 210 may calculate target addresses TADDR{B(i)} corresponding to the position elements B(i) read from the memory bank MBKB based on the read position elements B(i), the start address TSADD of the target data array TA and the unit size TSZ of the target elements T(i).

The calculated target addresses TADDR{B(i)} are stored in the target address register 220 and provided for access to the memory bank MBKT. The target elements T(i) are read out from the target addresses TADDR{B(i)} and the read target elements T(i) may be stored in the target data register 230.

In an exemplary embodiment, the arithmetic circuit 210 calculates the target addresses TADDR{B(i)} using Expression 3.

$$TADDR\{T(i)\}=TSADD+TSZ*(B(i)-1) \qquad \text{Expression 3}$$

In Expression 3, T(i) indicates the i-th target element, TADDR{T(i)} indicates the target address of the i-th target element, TSADD indicates the start address of the target data array, TSZ indicates the unit size of the target elements and B(i) indicates the i-th position element of the base array.

The multiplication in Expression 3 may be performed using a shifter (e.g., a shift register). In an embodiment, each target element is represent by $2^n$ bits, where n is an integer, and thus the shifter may replace an expensive multiplier. In an embodiment, each arithmetic unit (AU) is implemented with one shifter and one adder.

It is required to increase accuracy of detection and prediction of the indirect memory access and optimize the prefetching operation so as to reduce delay and cost of the indirect memory access. Exemplary embodiments are provided to solve the two problems, that is, the accuracy of detection and prediction of the indirect memory access and the optimization of the prefetching operation, to secure additional bandwidth for prefetching. As described above, the minimization of the prefetching cost is for preventing the delay of other memory accesses due to the prefetching, and for securing the bandwidth of the prefetching itself.

The memory bandwidth may include an external bandwidth and an internal bandwidth. Even though the external bandwidth is increased, an additional bandwidth may not be secured if the workload is optimized for the increased external bandwidth and thus the internal bandwidth has to be secured for prefetching. Accordingly in-memory prefetching according to exemplary embodiments are proposed for securing the bandwidth for prefetching.

For the in-memory prefetching according to exemplary embodiments of the inventive concept, the memory controller provides the indirect memory access information IMAI to the memory device according to the request of the host device so as to increase the accuracy of detection and prediction of the indirect memory access. At least the information on the base array BA and the target data array TA may be required for the in-memory prefetching.

In some exemplary embodiments, the memory controller provides the information to the memory device whenever the indirect memory access is required. As described above, the information may include the start address BSADD of the base array BA, the unit size BSZ of the position elements in the base array BA, the total number NT of the position elements and the read number NR of the position elements that are read simultaneously from the memory cell array, with respect to the base array BA. The information may include the start address TSADD of the target data array TA and the unit size TSZ of the target elements in the target data array TA, with respect to the target array TA.

Because the indirect memory access information IMAI may be transferred before the indirect memory access begins, the excessive bandwidth due to wrong detection is not exhausted.

To optimize the prefetching operation, according to exemplary embodiments of the inventive concept, parallelization of address calculations for the indirect memory access, that is, single instruction multiple data (SIMD) may be performed. For this, as illustrated in FIG. 8, the arithmetic circuit 210 may include NR arithmetic units AU configured to provide in parallel NR target addresses based on NR position elements that are read simultaneously from the memory cell array where NR is a natural number greater than one.

When the total number of the position elements is NT, the NR arithmetic units AU may provide NT target addresses by repeatedly performing address calculations NT/NR times, where NT is a natural number greater than one. While FIG. 8 illustrates four arithmetic units AU for convenience of illustration, exemplary embodiments are not limited thereto.

The four arithmetic units AU may receive in parallel the four position elements B(k)~B(k+3) of the base array BA that are read from the memory bank MBKB and provide in parallel the four target addresses TADDR{T(k)}~TADDR{(Tk+3)} through the calculation of Expression 3.

After that, the address calculations with respect to the next four position elements B(k+4)~B(k+7) and the read operation based on the calculated addresses may be performed. As such, the operation may be repeated NT/NR times to sequentially prefetch the target elements corresponding to all NT position elements. The address calculation and the read operation of the target elements may be performed by a pipeline scheme using the registers 220 and 230. In other words, the read operation of the previous target elements and the next address calculation may be performed simultaneously or may be overlapped. Through such parallel and pipelined operations, the entire prefetching time may be further reduced.

In an exemplary embodiment, the target data register 230 is implemented with a static random access memory (SRAM). Intermediate data such as the indirect memory access information IMAI and the target addresses TADDR, which are used in a calculation and are not required to be stored, are not transferred to external devices and thus only the target elements used in the operation (e.g., the SpMV) are stored in the SRAM and the external devices may access the data in the SRAM rapidly to reduce the entire operation time.

Figure 9:
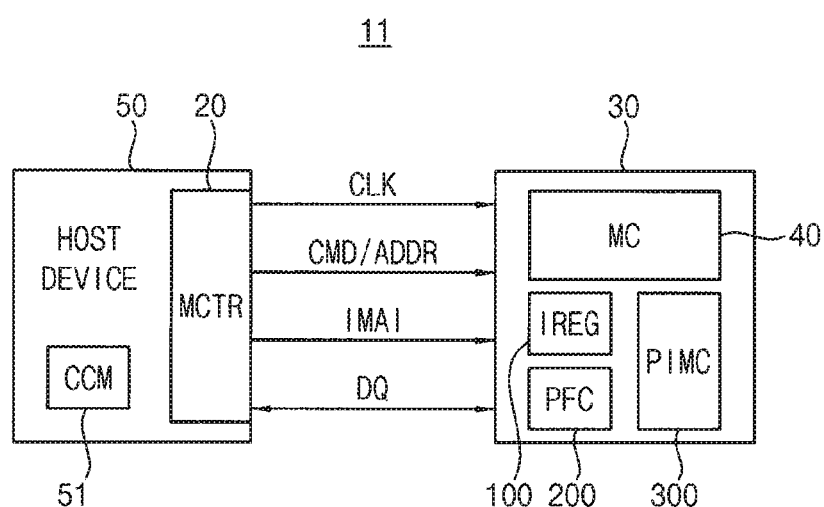
FIG. 9 is a block diagram illustrating a system including a memory device according to an exemplary embodiment of the inventive concept.

FIG. 9 is a block diagram illustrating a system including a memory device according to an exemplary embodiment of the inventive concept.

Referring to FIG. 9, a system 11 includes a host device 50 and a semiconductor memory device 30. The host device may include a processor (not shown), a memory controller 20 and a cache memory CCM 51. In an exemplary embodiment, the memory controller 20 is implemented as a component distinct from the host device 50. The semiconductor memory device 30 may include a memory cell array MC 40, an information register IREG 100, a prefetch circuit PFC 200 and a calculation circuit PIMC 300. Since FIG. 9 includes some elements of FIG. 1, their descriptions are omitted hereinafter.

As described with reference to FIG. 8, the target data register 230 in the prefetch circuit 200 may be implemented with the SRAM having a rapid access speed. In an exemplary embodiment, the memory controller 20 loads the target elements prefetched in the target data register 230 to the cache memory 51 of the host device 51, according to the request of the host device 50. In an exemplary embodiment, the host device 50 uses the target data register 230 as another cache memory. In this case, the target data register 230 has a lower cache level than the cache memory 51 in the host device 50.

In an embodiment, the calculation circuit 300 performs a processing-in-memory (PIM) operation based on first data and second data to provide calculation result data. As described above, the first data may be a sparse matrix, the second data may be a vector and the calculation circuit 300 may perform the SpMV as the PIM operation.

Figure 10:
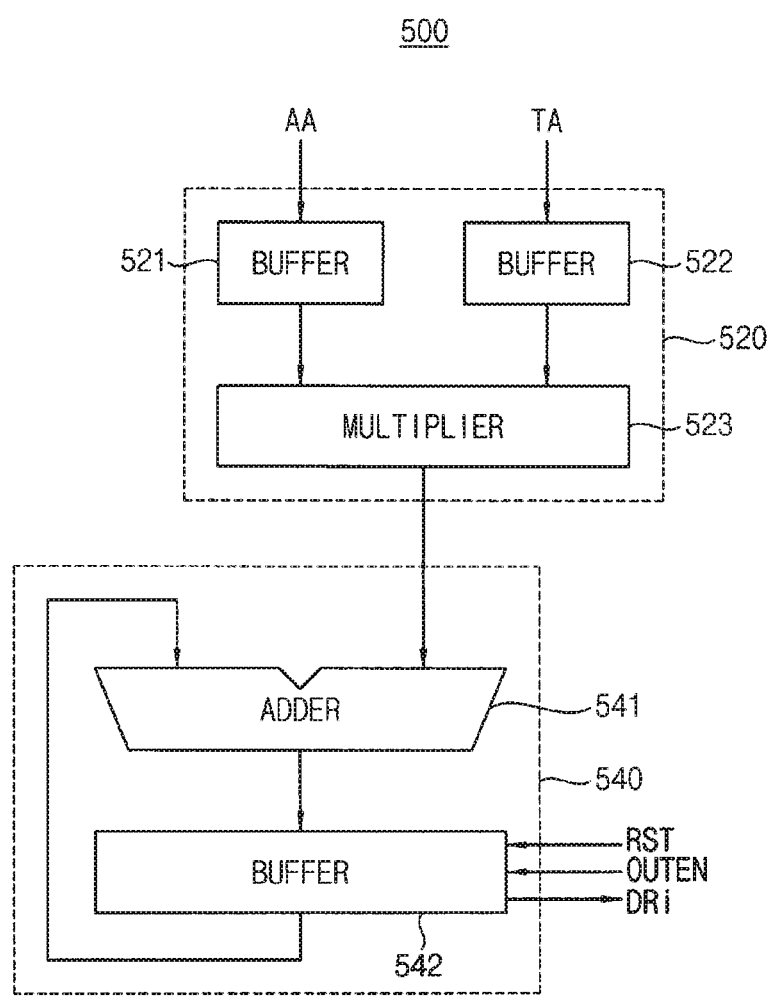
FIG. 10 is a diagram illustrating an exemplary embodiment of an operation unit for processing-in memory that is included in a memory device according to an exemplary embodiment of the inventive concept.

FIG. 10 is a diagram illustrating an example embodiment of an operation unit for performing a processing-in memory operation that is included in a memory device according to an exemplary embodiment of the inventive concept. The calculation circuit 300 in FIG. 9 may include a plurality of operation units as illustrated in FIG. 10 to perform parallel calculations.

Referring to FIG. 10, each operation unit 500 includes a multiplication circuit 520 and an accumulation circuit 540. The multiplication circuit 520 includes buffers 521 and 522 and a multiplier 523 configured to multiply the valid elements of the valid data array AA corresponding to the first data and the target elements of the target data array TA corresponding to the second data. The accumulation circuit 540 includes an adder 541 (e.g., an adding circuit) and a buffer 542 to accumulate outputs of the multiplication circuit 520 to provide the respective calculation result data DRi. For example, the multiplier 523 may multiply a first one of the valid elements by a first one of the target elements to generate a first result, the adder 541 may add the first result to an initial value (e.g., 0) received from buffer 542 to generate a first sum for storage in buffer 542, the multiplexer 523 may multiply a second one of the valid elements by a second one of the target elements to generate a second result, the adder 541 may add the second result to the first sum received from the buffer 542, etc. The accumulation circuit 540 may be initialized in response to a reset signal RST and output the respective calculation result data DRi in response to an output enable signal OUTEN. For example, a value of the buffer 542 could be set to 0 in response to the reset signal RST. For example, the respective calculation result data DRi may be the last output of the ADDER 541 that is stored in buffer 542 before the accumulation circuit 540 is reset. Using the operation unit 500 as illustrated in FIG. 10, operations such as the above-described SpMV may be performed efficiently.

Figure 11:
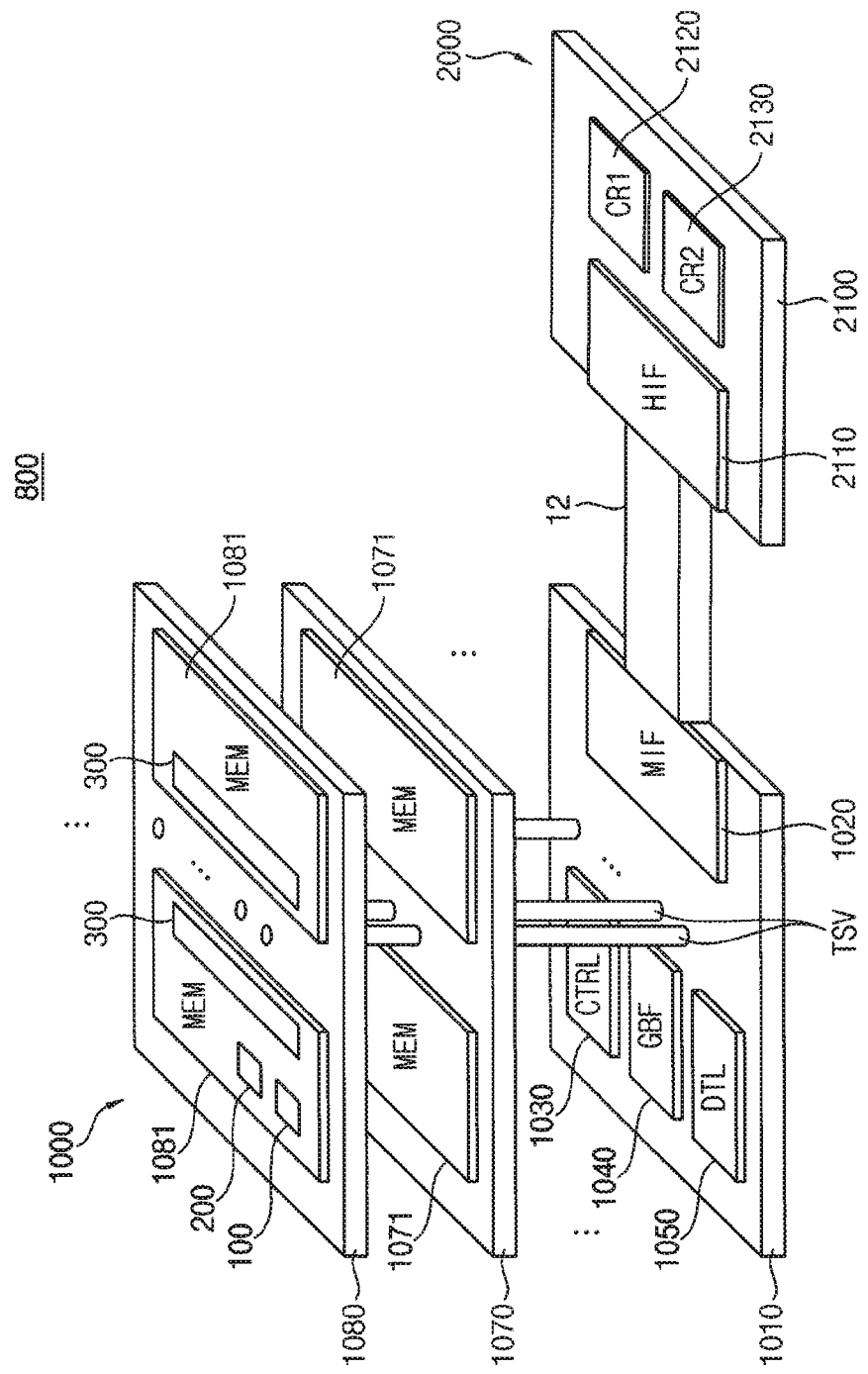
FIGS. 11 and 12 are exploded perspective views of a system including a stacked memory device according to exemplary embodiments of the inventive concept.
Figure 12:
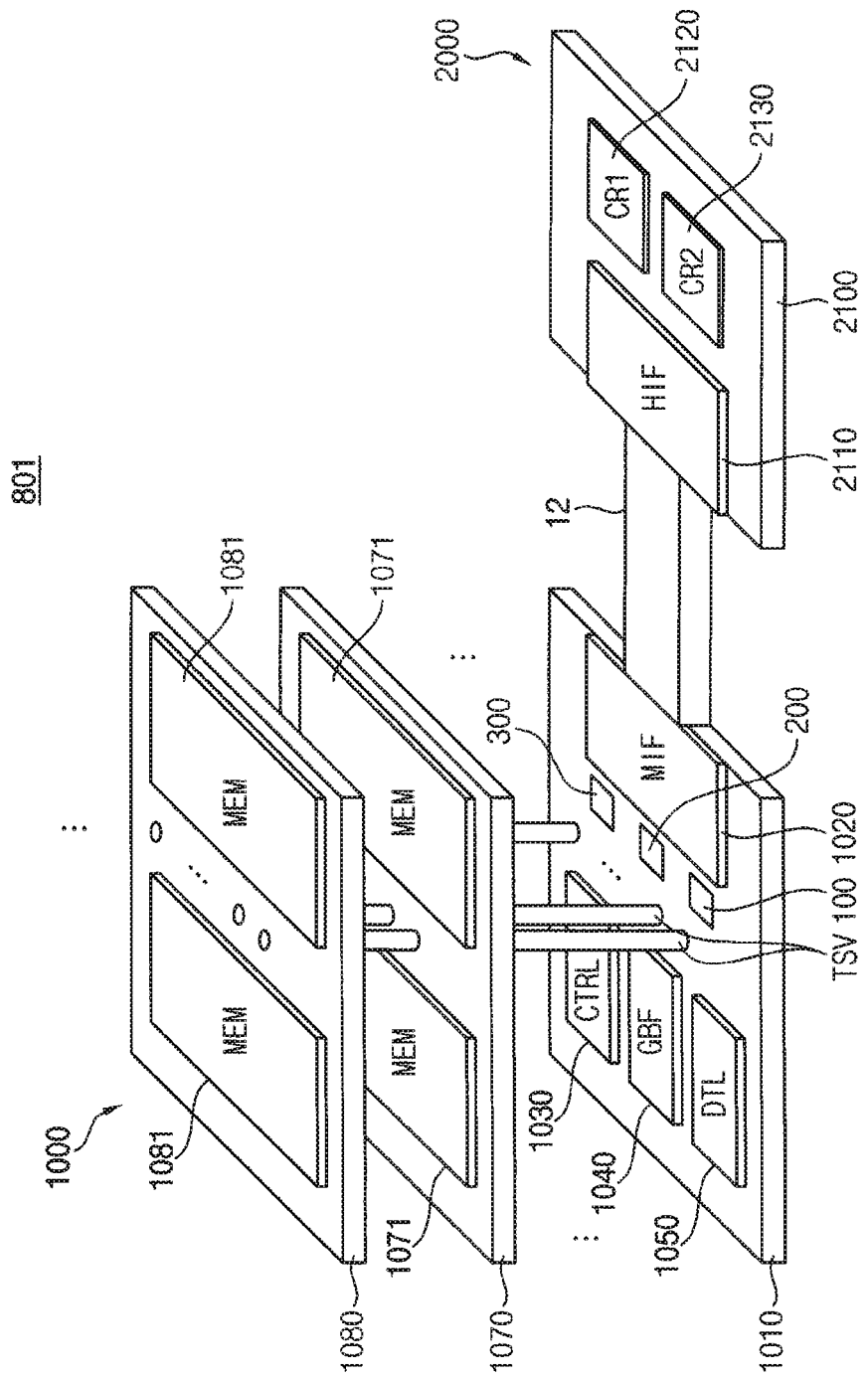

FIGS. 11 and 12 are exploded perspective views of a system including a stacked memory device according to exemplary embodiments of the inventive concept.

Referring to FIG. 11, a system 800 includes a stacked memory device 1000 and a host device 2000.

The stacked memory device 1000 may include a base semiconductor die or a logic semiconductor die 1010 and a plurality of memory semiconductor dies 1070 and 1080 stacked with the logic semiconductor die 1010. FIG. 11 illustrates a non-limiting example of one logic semiconductor die and two memory semiconductor dies. Two or more logic semiconductor dies and one, three or more memory semiconductor dies may be included in the stack structure. In addition, FIG. 11 illustrates a non-limiting example in that the memory semiconductor dies 1070 and 1080 are vertically stacked with the logic semiconductor die 1010. As will be described below with reference to FIG. 13, the memory semiconductor dies 1070 and 1080 except for the logic semiconductor die 1010 may be stacked vertically and the logic semiconductor die 1010 may be electrically connected to the memory semiconductor dies 1070 and 1080 through an interposer and/or a base substrate.

In an embodiment, the logic semiconductor die 1010 includes a memory interface MIF 1020 and logic (e.g., a logic circuit) to access memory integrated circuits 1071 and 1081 formed in the memory semiconductor dies 1070 and 1080. Such logic may include a control circuit CTRL 1030, a global buffer GBF 1040 and a data transform logic DTL 1050. In an embodiment, logic DTL 1050 is implemented by diode-transistor logic.

The memory interface 1020 may perform communication with an external device such as the host device 2000 through an interconnect device 12. For example, the memory interface 1020 may interface with a host interface (HIF) 2110 of the host device 2000. The host device 2000 may include a semiconductor die 2100 on which the HIF 2110 is mounted. Additional components 2120 and 2130 (e.g., processors) may be mounted on the semiconductor die 2100 of the host device 2000. The control circuit 1030 may control overall operations of the stacked memory device 1000. The data transform logic 1050 may perform logic operations on data exchanged with the memory semiconductor dies 1070 and 1080 or data exchanged through the memory interface 1020. For example, the data transform logic may perform a max pooling operation, a rectified linear unit (ReLU) operation, a channel-wise addition, etc.

The memory semiconductor dies 1070 and 1080 may include the memory integrated circuits 1071 and 1081, respectively. At least one of the memory semiconductor dies 1070 and 1080 may be a calculation semiconductor die 1080 that includes a calculation circuit 300. The calculation semiconductor die 1080 may include the information register 100 and the prefetch circuit 200 for performing the indirect memory prefetching as described above.

A system 801 of FIG. 12 is substantially the same as the system 800 of FIG. 11, and the repeated descriptions are omitted. Referring to FIG. 12, the above-described information register 100, the prefetch circuit 200 and the calculation circuit 300 may be included in the logic semiconductor die 1010.

Memory bandwidth and latency are performance bottlenecks in many processing systems. Memory capacity may be increased through the use of a stacked memory device in which a plurality of semiconductor devices are stacked in a package of a memory chip. The stacked semiconductor dies may be electrically connected through the use of through-silicon vias or through-substrate vias (TSVs). Such stacking technology may increase memory capacity and also suppress bandwidth and latency penalties. Each access of an external device to the stacked memory device involves data communication between the stacked semiconductor dies. In this case, inter-device bandwidth and inter-device latency penalties may occur twice for each access. Accordingly, the inter-device bandwidth and inter-device latency may have a significant impact on processing efficiency and power consumption of the system when a task of the external device requires multiple accesses to the stacked memory device.

The stacked memory device and the system according to at least one exemplary embodiment may reduce delay and power consumption by combining memory-intensive or data-intensive data process and memory access by efficiently using the information register, the prefetch circuit and the calculation circuit disposed in the logic semiconductor die or in the memory semiconductor die.

Exemplary embodiments of disposing the information register 100, the prefetch circuit 200 and the calculation circuit 300 are described with reference to FIGS. 11 and 12, but exemplary embodiments of the inventive concept are not limited thereto. According to an exemplary embodiment of the inventive concept, the information register 100 and the prefetch circuit 200 are disposed in the memory semiconductor die and the calculation circuit 300 is disposed in the logic semiconductor die.

Figure 13:
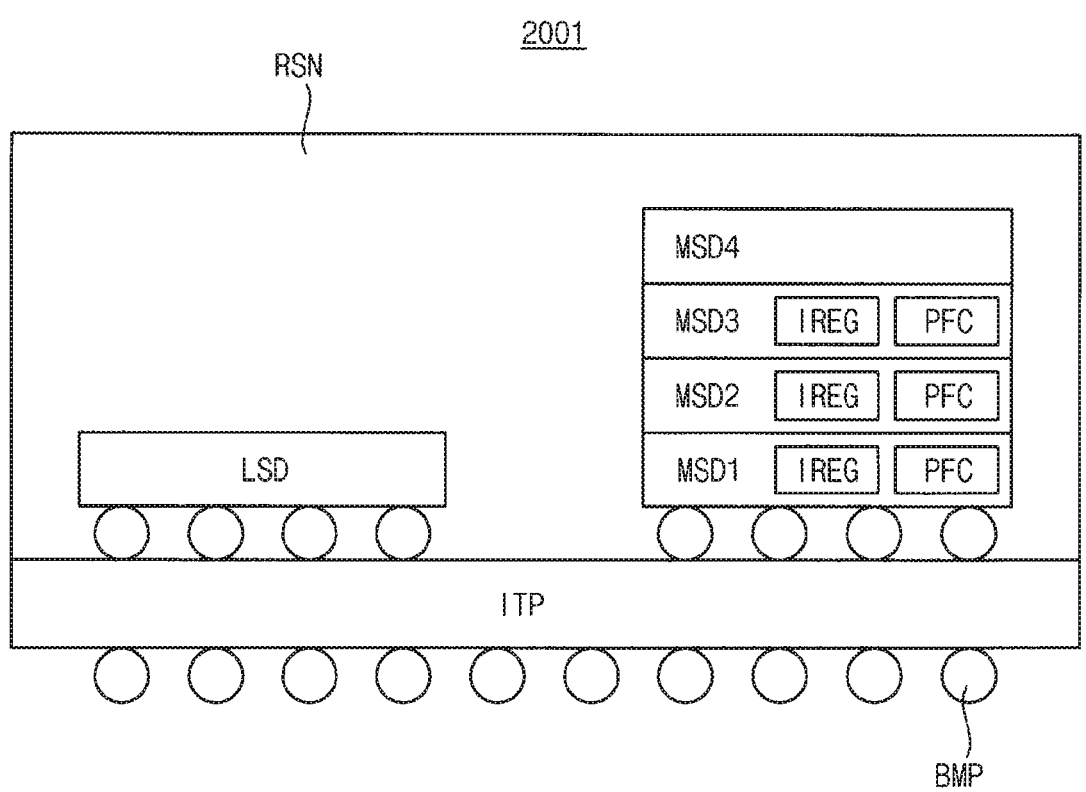
FIGS. 13 and 14 are diagrams illustrating packaging structures of a stacked memory device according to exemplary embodiments of the inventive concept.
Figure 14:
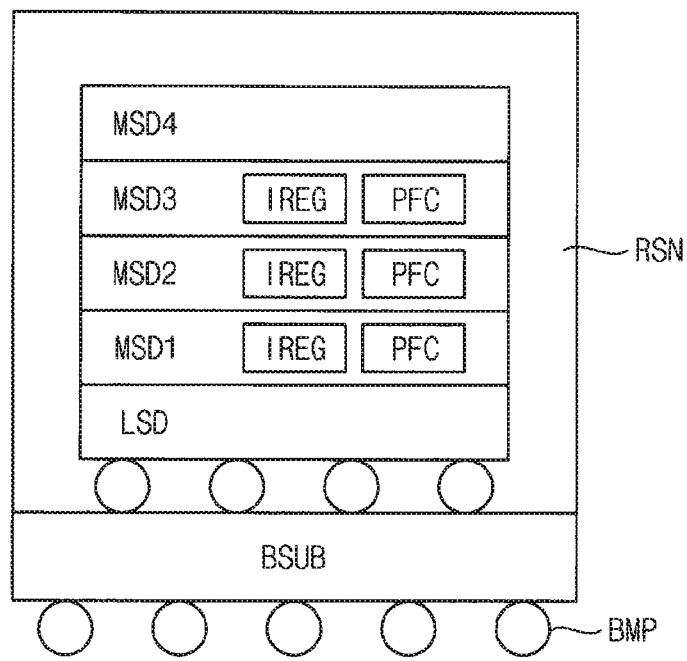

FIGS. 13 and 14 are diagrams illustrating packaging structures of a stacked memory device according to exemplary embodiments of the inventive concept.

Referring to FIG. 13, a memory chip 2001 includes an interposer ITP and a stacked memory device stacked on the interposer ITP. The interposer ITP may be implemented by an electric interface for interfacing between one socket or connection to another. The stacked memory device may include a logic semiconductor die LSD and a plurality of memory semiconductor dies MSD1~MSD4.

Referring to FIG. 14, a memory chip 2002 includes a base substrate BSUB and a stacked memory device stacked on the base substrate BSUB. The stacked memory device may include a logic semiconductor die LSD and a plurality of memory semiconductor dies MSD1~MSD4.

FIG. 13 illustrates a structure in which the memory semiconductor dies MSD1~MSD4 except for the logic semiconductor die LSD are stacked vertically and the logic semiconductor die LSD is electrically connected to the memory semiconductor dies MSD1~MSD4 through the interposer ITP or the base substrate. In contrast, FIG. 14 illustrates a structure in which the logic semiconductor die LSD is stacked vertically with the memory semiconductor dies MSD1~MSD4.

As described above, at least one of the memory semiconductor dies MSD1~MSD4 may include the information register IREG and the prefetch circuit PFC as described above. Although not illustrated, the above-described calculation circuit may be included in the memory semiconductor dies MSD1~MSD4 and/or in the logic semiconductor die LSD.

The base substrate BSUB may be the same as the interposer ITP or include the interposer ITP. The base substrate BSUB may be a printed circuit board (PCB). External connecting elements such as conductive bumps BMP may be formed on a lower surface of the base substrate BSUB and internal connecting elements such as conductive bumps may be formed on an upper surface of the base substrate BSUB. In the exemplary embodiment of FIG. 13, the logic semiconductor die LSD and the memory semiconductor dies MSD1~MSD4 may be electrically connected through the through-silicon vias. The stacked semiconductor dies LSD and MSD1~MSD4 may be packaged using resin RSN.

Figure 15:
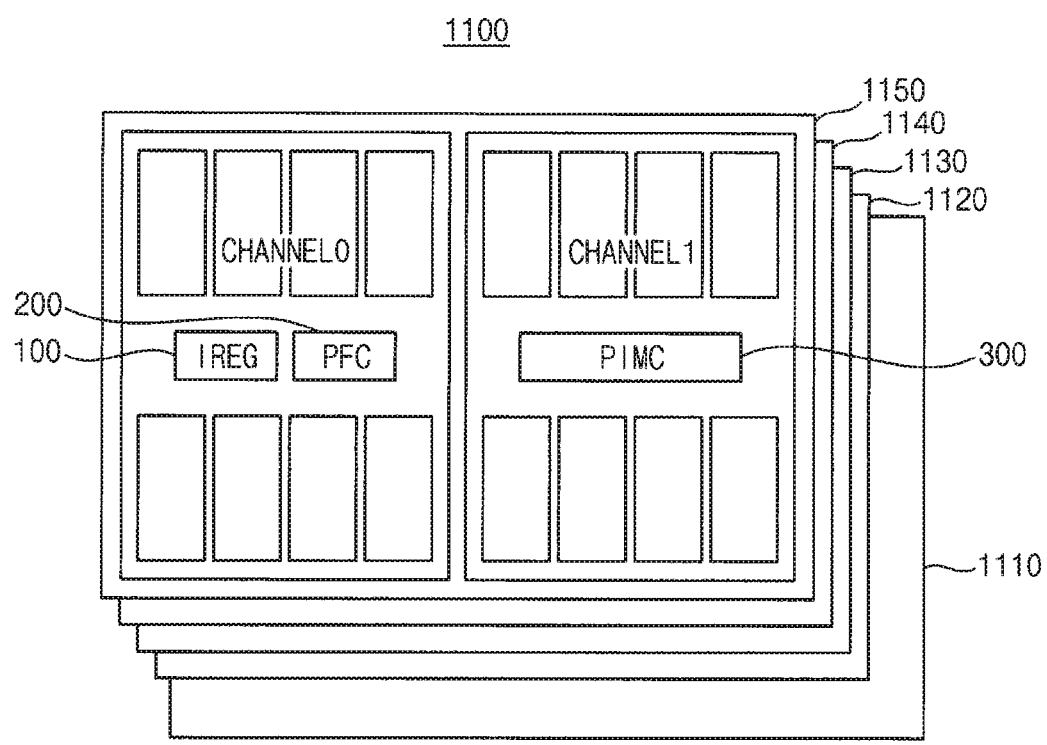
FIG. 15 is a diagram illustrating an example structure of a stacked memory device according to an exemplary embodiment of the inventive concept.

FIG. 15 is a diagram illustrating an example structure of a stacked memory device according to an exemplary embodiment of the inventive concept.

Referring to FIG. 15, a high bandwidth memory (HBM) 1100 may be configured to have a stack of multiple DRAM semiconductor dies 1120, 1130, 1140 and 1150. The HBM 1100 of the stack structure may be optimized by a plurality of independent interfaces called channels. Each DRAM stack may support up to eight channels in accordance with the HBM standards. FIG. 15 shows an example stack containing four DRAM semiconductor dies 1120, 1130, 1140 and 1150 and each DRAM semiconductor die supports two channels CHANNEL0 and CHANNEL1.

Each channel provides access to an independent set of DRAM banks. Requests from one channel do not access data attached to a different channel. Channels are independently clocked, and need not be synchronous.

The HBM 1100 may further include an interface die 1110 or a logic die disposed at a bottom of the stack structure to provide signal routing and other functions. Some functions for the DRAM semiconductor dies 1120, 1130, 1140 and 1150 may be implemented in the interface die 1110.

At least one of the DRAM semiconductor dies 1120, 1130, 1140 and 1150 may include the information register 100 and the prefetch circuit 200 for performing the indirect memory prefetching and the calculation circuit 300 for the PIM operation as described above.

Figure 16:
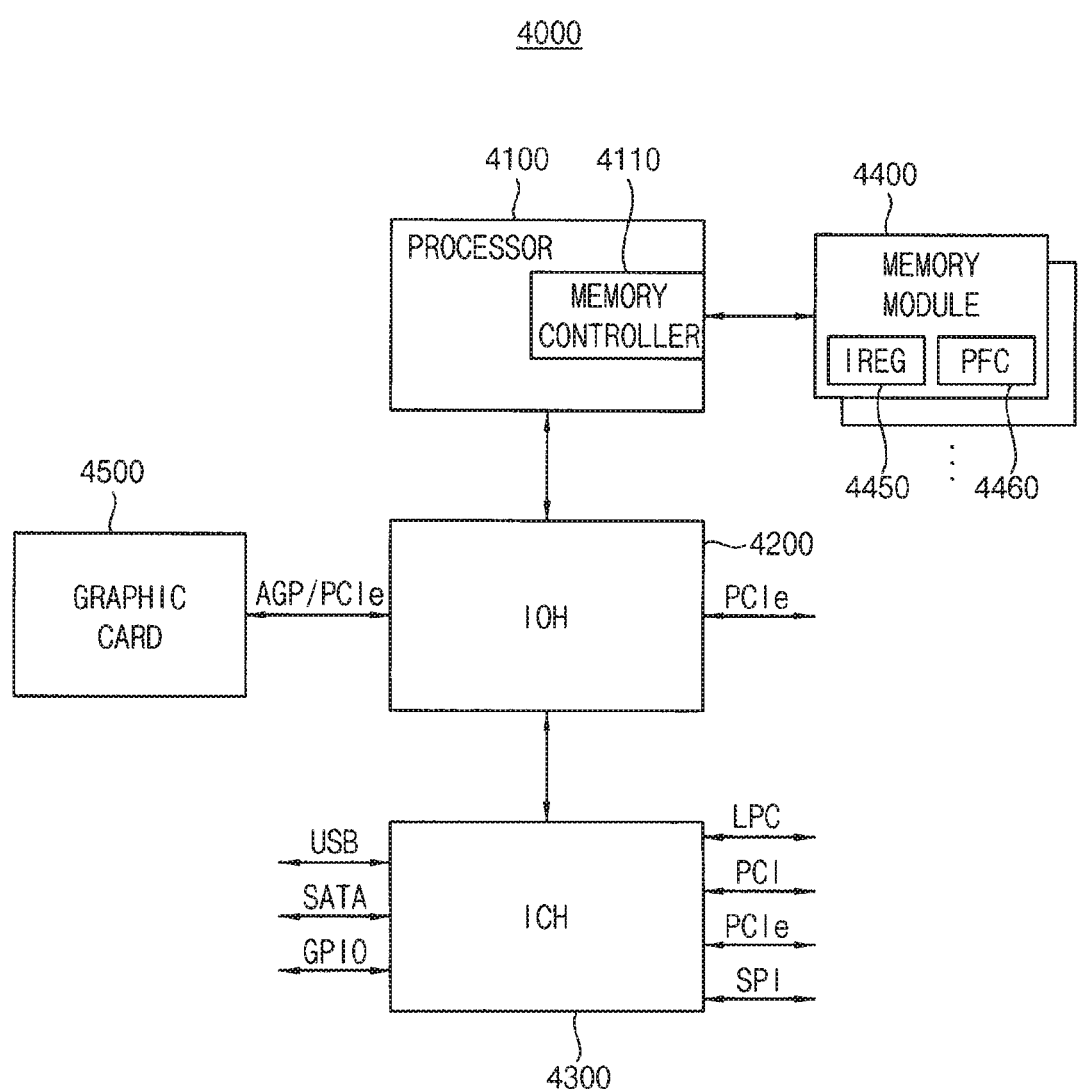
FIG. 16 is a block diagram illustrating a computing system according to an exemplary embodiment of the inventive concept.

FIG. 16 is a block diagram illustrating a computing system according to an exemplary embodiment of the inventive concept.

Referring to FIG. 16, a computing system 4000 includes a processor 4100, an input/output hub IOH 4200, an input/output controller hub ICH 4300, at least one memory module 4400, and a graphic card 4500.

The processor 4100 may perform various computing functions such as executing software for performing calculations or tasks. For example, the processor 4100 may be a microprocessor, a central processing unit (CPU), a digital signal processor, or the like. The processor 4100 may include a memory controller 4110 for controlling operations of the memory module 4400. The memory module 4400 may include a plurality of memory devices that store data provided from the memory controller 4110. At least one of the memory devices in the memory module 4400 may include the information register 100 and the prefetch circuit 200 for performing the indirect memory prefetching as described above. In an embodiment, the processor 4100 is part of a host device.

The input/output hub 4200 may manage data transfer between processor 4100 and devices, such as the graphic card 4500. In an embodiment, the input/output hub 4200 is implemented by a microchip. The graphics card 4500 may control a display device for displaying an image. The input/output controller hub 4300 may perform data buffering and interface arbitration to efficiently operate various system interfaces. The components in FIG. 16 may be coupled to various interfaces, such as an accelerated graphics port (AGP) interface, a peripheral component interface (PCI), a peripheral component interface-express (PCIe), a universal serial bus (USB) port, a serial advanced technology attachment (SATA) port, a low pin count (LPC) bus, a serial peripheral interface (SPI), a general purpose input/output (GPIO), etc.

As described above, the memory device and the system according to at least one exemplary embodiment of the inventive concept may enhance accuracy and efficiency of in-memory prefetching by performing an indirect memory access based on indirect memory access information provided from the memory controller. In addition, the memory device and the system according to at least one exemplary embodiment of the inventive concept may reduce delay of the indirect memory access and increase a speed of the in-memory prefetching by parallelizing data disposition for the indirect memory access and more effectively utilizing a bandwidth inside the memory device. Further, the memory device and the system according to at least one exemplary embodiment may perform sparse data operation efficiently by performing a processing-in-memory operation using the in-memory prefetching.

The present inventive concept may be applied to memory devices and systems including a memory device. For example, the present inventive concept may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of exemplary embodiments of the inventive concept and is not to be construed as limiting thereof. Although a few exemplary embodiments have been described, those skilled in the art will readily appreciate that many modifications are possible in the exemplary embodiments without materially departing from the present inventive concept.

What is claimed is:

1. A memory device for prefetching data to be used in a matrix multiplication operation of a sparse matrix with a vector, the memory device comprising:
   a memory cell array configured to store a valid data array, a base array and a target data array, the valid data array sequentially including valid elements that are non-zero elements of the sparce matrix, the base array sequentially including position elements indicating positions of the valid elements within the sparse matrix, the target data array sequentially including target elements of the vector corresponding to columns of the sparse matrix;
   an information register configured to store indirect memory access information including a start address of the target data array, a unit size of the target elements, and a read number NR of the position elements that are read simultaneously from the memory cell array, received from an external memory controller; and
   a prefetch circuit configured to prefetch, based on the indirect memory access information stored in the information register, the target elements corresponding to the read number NR of the position elements.

2. The memory device of claim 1, wherein the memory cell array includes a plurality of memory banks, and wherein the valid data array, the base array and the target data array are stored in different memory banks among the plurality of memory banks.

3. The memory device of claim 1, wherein the prefetch circuit includes:
   an arithmetic circuit configured to calculate target addresses corresponding to the read position elements based on the read position elements, a start address of the target data array and the unit size of the target elements;
   a target address register configured to store the target addresses calculated by the arithmetic circuit; and
   a target data register configured to store the target elements that are read from the target addresses of the memory cell array.

4. The memory device of claim 3, wherein the arithmetic circuit calculates an i-th one of the target addresses by multiplying the unit size by B(i)−1 and adding the start address to a result of the multiplying, where B(i) indicates an i-th one of the position elements in the base array.

5. The memory device of claim 1, wherein the prefetch circuit includes:
   NR arithmetic units configured to provide in parallel NR target addresses based on the NR position elements that are read simultaneously from the memory cell array where NR is a natural number greater than one.

6. The memory device of claim 5, wherein, when a total number of the position elements is NT, the NR arithmetic units provides NT target addresses by repeatedly performing address calculations NT/NR times, where NT is a natural number greater than one.

7. The memory device of claim 3, wherein the target data register is implemented with a static random access memory (SRAM).

8. The memory device of claim 1, wherein the indirect memory access information further includes a start address of the base array, a unit size of the position elements and a total number of the position elements.

9. The memory device of claim 1, further comprising: a calculation circuit configured to perform a processing-in-memory operation based on the sparse matrix and the vector to provide calculation result data.

10. The memory device of claim 9, wherein the processing-in-memory operation performs the matrix multiplication operation as a sparse matrix vector multiplication on the sparse matrix and the vector.

11. A memory device comprising:
a plurality of memory semiconductor dies stacked in a vertical direction in which memory cell arrays are formed, the memory cell arrays storing a valid data array, a base array and a target data array, the valid data array sequentially including valid elements among elements of first data, the base array sequentially including position elements indicating position values corresponding to the valid elements, the target data array sequentially including target elements of second data corresponding to the position values;
a plurality of through-silicon vias electrically connecting the plurality of memory semiconductor dies;
an information register configured to store indirect memory access information including a start address of the target data array and a unit size of the target elements; and
a prefetch circuit configured to prefetch, based on the indirect memory access information, the target elements corresponding to the position elements that are read from the memory cell array,
wherein the prefetch circuit provides in parallel NR target addresses based on NR position elements that are read simultaneously from the memory cell array where NR is a natural number greater than one.

12. The memory device of claim 11, wherein the prefetch circuit is located in the memory semiconductor die in which the memory cell array storing the valid data array, the base array and the target data array are located.

13. The memory device of claim 11, further comprising: a logic semiconductor die including a circuit for controlling access to the memory cell arrays, wherein the prefetch circuit is formed in the logic semiconductor die.

14. The memory device of claim 11, wherein the indirect memory access information is provided from an external memory controller to the memory device.

15. A memory device comprising:
a memory cell array configured to store a valid data array, a base array and a target data array, the valid data array sequentially including valid elements among elements of first data, the base array sequentially including position elements indicating position values corresponding to the valid elements, the target data array sequentially including target elements of second data corresponding to the position values;
a random access memory (RAM); and
a controller configured to receive indirect memory access information including a start address of the target data array, a unit size of the target elements and a read number NR of the position elements that are read simultaneously from the memory cell array, from an external device,
wherein the controller performs a prefetching operation in response to receipt of the indirect memory access information,
wherein the prefetching operation reads the target elements corresponding to the read number NR of the position elements using the start address and the unit size and stores the read target elements into the RAM.

16. The memory device of claim 15, wherein the prefetching operation calculates the target addresses corresponding to the read position elements based on the read position elements, the start address and the unit size and performs the reads using the calculated target addresses.

17. The memory device of claim 16, wherein the controller calculates an i-th one of the target addresses by multiplying the unit size by B(i)−1 and adding the start address to a result of the multiplying, where B(i) indicates an i-th one of the position elements in the base array.

18. The memory device of claim 15, wherein the first data is a sparce matrix, the second data is a vector, the valid elements are non-zero elements of the sparce matrix, the position elements indicate positions of the valid elements within the sparce matrix, and the target elements are elements of the vector corresponding to columns of the sparse matrix.

* * * * *